United States Patent [19]

Caswell

[11] 3,860,855

[45] Jan. 14, 1975

[54] MULTIPLE VOLTAGE SOURCE IMBALANCE DETECTION AND PROTECTION CIRCUIT

[75] Inventor: Robert L. Caswell, Placentia, Calif.

[73] Assignee: Rockwell International Corporation, El Segundo, Calif.

[22] Filed: Dec. 7, 1973

[21] Appl. No.: 422,624

[52] U.S. Cl. .................. 317/27 R, 307/75, 317/31, 317/33 R

[51] Int. Cl. .......................................... H02h 3/28

[58] Field of Search ........... 323/15; 307/51, 75, 86, 307/87; 317/27, 31, 33 R

[56] References Cited

UNITED STATES PATENTS 3,167,685 1/1965 Bade et al. ........................ 307/75 X

*Primary Examiner*—James D. Trammell
*Attorney, Agent, or Firm*—H. Fredrick Hamann; G. Donald Weber, Jr.; Robert Ochis

[57] ABSTRACT

Voltage protection circuitry for sensing imbalance of the balanced positive and negative voltage sources is disclosed. When imbalance is detected, the sensing circuitry activates protection devices to prevent damage to other circuitry supplied by the balanced supplies.

9 Claims, 1 Drawing Figure

PATENTED JAN 14 1975 3,860,855
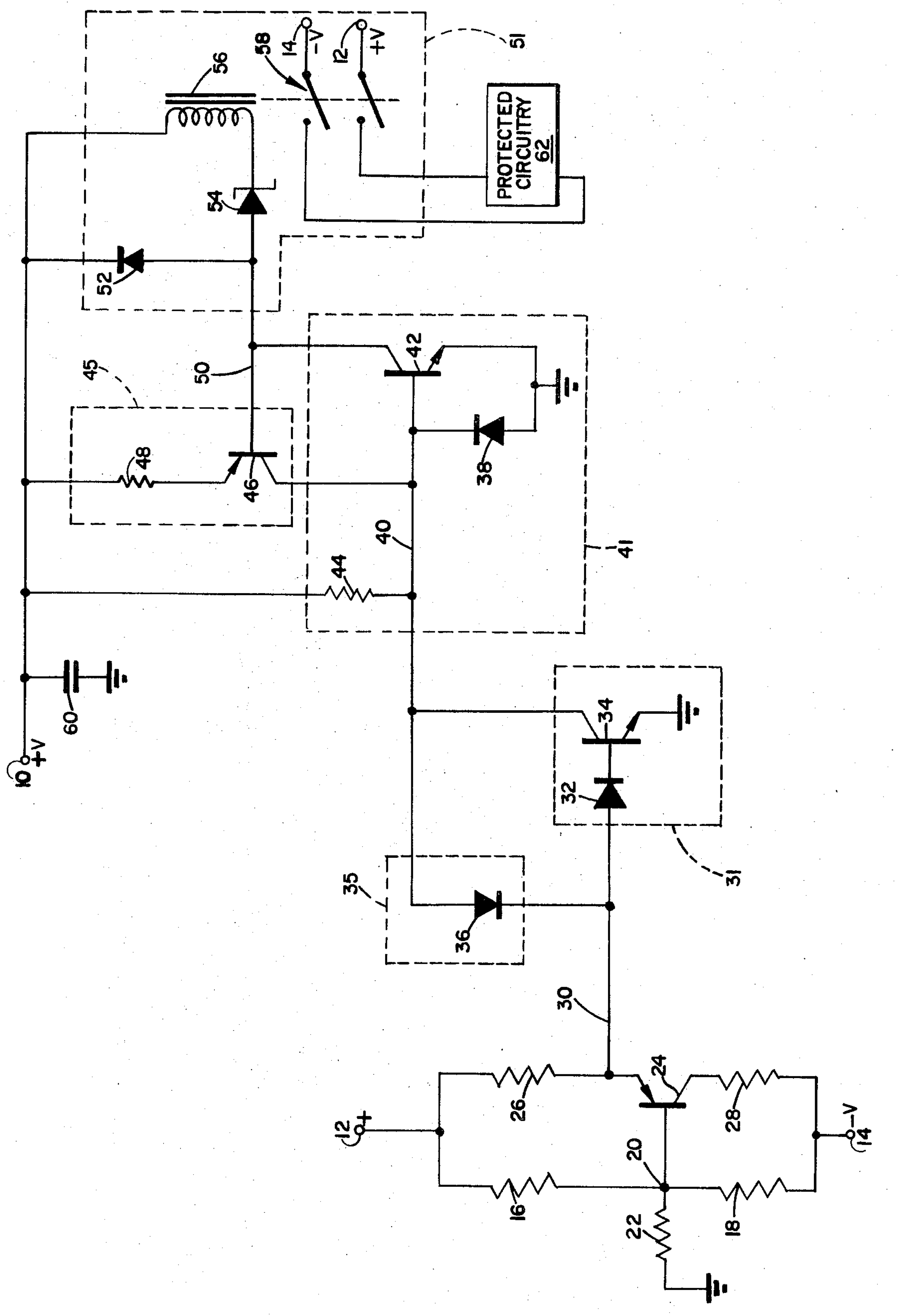

MULTIPLE VOLTAGE SOURCE IMBALANCE DETECTION AND PROTECTION CIRCUIT

BACKGROUND OF THE INVENTION

1. Field of the Invention

This invention relates to the field of voltage-source voltage-level monitoring equipment for protecting circuitry which could be damaged in the event of voltage source malfunction. More particularly, the invention relates to the field of equipment for preventing damage as a result of undesirable imbalance between balanced positive and negative power supplies.

2. Prior Art

With the advent of semiconductor circuitry, prevention of the application of improper voltages to electronic circuits became important. Semiconductor circuits are easily damaged by application of voltages even slightly different than those for which the circuitry is designed. As a consequence, circuits for sensing and responding to either over voltage or under voltage conditions were developed to sense and correct for the application of improper voltages before semiconductor circuits connected thereto were damaged. Such circuits, however, did not fill all of the needs for voltage protection. Many semiconductor circuits operate from balanced voltage supplies. With balanced voltage supplies, one supply provides a relatively positive voltage and the other provides a relatively negative voltage, usually of equal magnitude relative to a common or base reference voltage level. Over voltage and under voltage protection circuitry can sense some of the problems with balanced power supplies. However, such systems cannot sense and correct for imbalance between the two supplies. Many of the circuits which require balanced power supplies for operation are easily destroyed by imbalance between the power supplies.

SUMMARY OF THE INVENTION

The instant invention is a voltage source imbalance detector which may activate protection equipment upon sensing an imbalance condition between normally balanced voltage sources in excess of a predetermined threshold imbalance. Voltage divider means adjusted to produce a reference voltage level, such as ground voltage at an output terminal generates a signal whose deviation from the voltage reference level is an indication of the imbalance condition between the monitored voltage sources. The output terminal of the voltage divider means is connected to an output node by a current isolation means. The current isolation means establishes a voltage at the output node which tracks the voltage at the output terminal of the voltage divider means and isolates the voltage divider output terminal from current into the output node. Input terminals of positive imbalance sensing means and negative imbalance sensing means are electrically connected to the output node. An output logic switching means has its input terminal connected to the output terminals of the positive and negative imbalance sensing means. The output logic switching means is normally on, but is turned off when either the positive imbalance sensing means or the negative imbalance sensing means senses an excessive imbalance. When the output logic switching means turns off, an alarm may be actuated or a relay may be deactivated to disconnect protected circuitry from the monitored voltage supplies. Hysteresis is induced in the switching characteristics of the output logic switching means by a hysteresis inducing means to prevent chatter of the relay when a voltage source imbalance is at a threshold level.

BRIEF DESCRIPTION OF THE DRAWING

The single drawing FIGURE is a schematic diagram of a voltage source imbalance detector and protection circuit in accordance with the invention.

DETAILED DESCRIPTION OF THE PREFERRED EMBODIMENT

Voltage sources 12 and 14 are adapted to supply predetermined values of voltages to a circuit. The predetermined voltages have a specified relationship, e.g. balanced about an arbitrary standard or reference value, such as ground. Circuitry illustrated in schematic form in the FIGURE detects the presence of imbalance between voltage sources 12 and 14 and upon such detection takes action to protect circuitry 62 from possible resulting harm. A voltage divider comprised of resistors 16 and 18 is connected from relatively positive voltage source 12 to relatively negative voltage source 14. The common connection of resistors 16 and 18 constitutes a voltage divider output node 20. A desensitizing resistor 22 is connected from node 20 to a suitable reference potential, for example ground. Node 20 is also connected to the base electrode of transistor 24. In the preferred embodiment, transistor 24 is a PNP transistor and provides isolation between nodes 20 and 30 as discussed infra. For protecting against imbalance of balanced power supplies of equal magnitudes relative to the reference potential at node 20, resistors 16 and 18 have equal resistances. Thus, node 20 is at ground potential under normal operating conditions of the embodiment shown.

Desensitizing resistor 22 connected between node 20 and ground reduces the sensitivity of the voltage imbalance detector. That is, the smaller the resistance of desensitizing resistor 22, the more current is bled to ground from node 20 when an imbalance exists. This current bleeding increases the degree of imbalance necessary to cause the voltage at node 20 to deviate sufficiently from ground to activate sensing circuitry to provide a voltage imbalance indication. If maximum sensitivity is desired, desensitizing resistor 22 may be omitted.

A resistor 26 is connected from positive voltage source 12 to the emitter of isolation transistor 24. Under normal operating conditions resistor 26 determines the value of the emitter current of sensing transistor 24. A resistor 28 is connected from the collector of transistor 24 to negative voltage source 14. An output node 30 at the connection of resistor 26 to the emitter of transistor 24 completes an emitter follower connection of isolation transistor 24.

Typically, resistor 26 is much larger than resistor 28 because resistor 26 is used only to conduct base current to transistor 34 during one imbalance condition. Contrariwise, resistor 28 must conduct the larger base current of transistor 42 in order to turn transistor 42 off under a different imbalance condition.

Isolation transistor 24 serves to isolate node 30 from node 20 during sensing operations. Thus, the conditions at node 20 are independent of current flow into node 30 from other circuitry connected thereto.

A diode 32 has the anode thereof connected to node 30 and the cathode thereof connected to the base of transistor 34. In this embodiment transistor 34 is an NPN type which is turned on when the voltage level at node 30 becomes sufficiently high. Diode 32 and transistor 34 together comprise a positive imbalance sensing means 31. In response to a positive imbalance in excess of a predetermined response threshold of the voltage imbalance detection circuitry which is controlled by desensitizing resistor 22, positive imbalance sensing means 31 generates an alarm turn-off signal at the collector of transistor 34 which is electrically connected to a node 40.

Diode 36 has the cathode thereof connected to node 30 and the anode thereof connected to the collector electrode of transistor 34 at node 40. Diode 36 constitutes a negative imbalance sensing means 35. In response to a negative imbalance in excess of the predetermined response threshold of the voltage imbalance detection circuitry which is controlled by desensitizing resistor 22. Negative imbalance sensing means 35 produces an alarm or turn off signal at the anode of diode 36 which is electrically connected to node 40.

An NPN output logic switching transistor 42 has the base electrode thereof connected to node 40, the emitter electrode connected to a suitable reference potential such as ground and the collector electrode thereof connected to output node 50. A resistor 44 is connected between voltage source 10 and node 40. Voltage source 10, in this embodiment, is relatively positive and may be the same as voltage source 12. A portion of the base current for transistor 42 when it is on is supplied via resistor 44. In fact, current through resistor 44 alone is generally sufficient to turn on transistor 42. A diode 38 is connected across the base-emitter diode of NPN transistor 42. In particular, the cathode thereof is connected to the base electrode of transistor 42 at node 40 and the anode of diode 38 is connected to the emitter electrode of the transistor. Diode 38 protects the base-emitter diode of transistor 42 from excessive back bias, which could destroy the p-n junction of the base-emitter diode and thus the transistor. Naturally, if the p-n junction of the base-emitter diode of transistor 42 can withstand the largest back-bias condition which it could be subjected by the subject circuit, diode 38 can be omitted. Output logic switching transistor 42, resistor 44, and diode 38 comprise an output logic switching means 41 which is on when the monitored voltage sources are in their normal balanced condition and which is off when the monitored voltage sources are unbalanced in excess of the predetermined threshold response levels discussed previously. In the embodiment illustrated, logic switching means 41 provides a relatively negative voltage, for example ground, at output node 50 when it is on and a relatively high voltage, for example +V, at output node 50 when it is off.

A PNP switching point hysteresis transistor 46 has the collector electrode thereof connected to node 40, the base electrode thereof connected to output node 50 and to emitter electrode thereof connected through a resistor 48 to voltage source 10. In order to introduce hysteresis in the switching characteristics of transistor 42, transistor 46 supplies additional base current to transistor 42 when the transistor 42 is on. As explained supra, the base current necessary to turn transistor 42 on flows through resistor 44. Transistor 46 and resistor 48 together comprise a switching point hysteresis means 45 for inducing hysteresis in the switching characteristics of logic output transistor 42.

Positive imbalance sensing means 31, negative imbalance sensing means 35, logic switching means 41, and switching point hysteresis means 45 together comprise a limit sensing means which senses whether monitored voltage sources 12 and 14 are in their normal balanced condition or in an abnormal unbalanced condition.

A transient suppression diode 52 has the anode thereof connected to output node 50 and the cathode thereof connected to positive voltage supply 10. Diode 52 limits voltage transients at output node 50 by short circuiting positive voltages at node 50 in excess of the value of supply 10. This protects the base-emitter diode of hysteresis transistor 46 and the collector of logic switching transistor 42 from excessive voltages by clamping node 50 to the voltage level supplied by source 10 (plus voltage drops). If transient voltages at output node 50 are not a problem, diode 52 may be omitted.

Output node 50 is connected through a zener diode 54 to one end of the winding of a relay 56. The other end of the winding of relay 56 is connected to positive voltage source 10. Relay 56 controls a set of relay contacts 58. Diode 54 has the anode thereof connected to node 50 and the cathode thereof connected to the relay winding. Diode 54 may be omitted where relay 56 is rated for use with voltage source 10. However, where voltage supply 10 provides a voltage greater than the rating of relay 56, diode 54 is selected to have a zener voltage equal to the difference between the relay rating and the voltage provided by source 10. This eliminates the need for special relays, while preventing burnout of standard relays with lower voltage ratings. Relay 56, its controlled switch contacts 58, zener diode 54 and transient suppression diode 52 together comprise a protection means 51 for selectively disconnecting protected circuitry from monitored voltage sources 12 and 14 in the event of abnormal imbalance.

Capacitor 60 is a local power bypass which assures a low AC impedance of positive voltage supply 10.

The instant invention is simpler and less costly than dual under and over voltage sensors.

OPERATION OF THE PREFERRED EMBODIMENT

When voltage supplies 12 and 14 are balanced, the voltage divider comprised of series connected resistors 16 and 18 produces a specified standard voltage, i.e., ground voltage at node 20. Under these conditions no current flows through desensitizing resistor 22 and isolation transistor 24 is on (i.e., conductive). When isolation transistor 24 is on, the voltage at node 30 is, effectively, clamped to track the voltage at node 20, but offset from the voltage at node 20 by forward voltage drop across the forward biased base-emitter diode. This voltage drop is substantially constant so long as transistor 24 remains conductive. In one embodiment, transistor 24 is a silicon transistor wherein the forward voltage drop is 0.6 volts. Thus, node 30 is at +0.6 volts. With +0.6 volts at node 30, transistor 34 is off (i.e., nonconductive) and there is no current in diode 36. Under these conditions (i.e., no current in diode 36 or transistor 34) any current into node 40 from resistor 44 must flow out of node 40 through the base of transistor 42. Consequently, the voltage at node 40 rises to a level sufficient to hold transistor 42 conductive in order for the current from resistor 44 to flow out of node 40. With transistor 42 on, the voltage at node 40 cannot rise above the forward voltage drop (i.e., +0.6 volts)

across the base-emitter diode of silicon transistor 42 the emitter of which is grounded. Inasmuch as both nodes 30 and 40 are at +0.6 volts, there is no voltage across diode 36 and it conducts no current.

With transistor 42 in the on condition, output node 50 is clamped at about ground level, since transistor 42 conducts heavily. This low voltage level at node 50 holds transistor 46 in the on condition by establishing a forward bias across its base-emitter diode. The collector current of transistor 46 and current through to resistor 44, from source 10 is supplied to transistor 42 as base current to maintain transistor 42 in the on condition. With transistor 42 on, diode 52 is back-biased and does not affect the voltage at output node 50. With output node 50 held at ground level the winding of relay 56 has a voltage equal to the voltage of source 10, minus the voltage of zener diode 54 thereacross. Sufficient current flows through the winding or coil to hold relay 56 on and the contacts 58 in their activated or closed position to provide a continuous electrical circuit from the monitored voltage sources 12 and 14 to protected circuitry 62.

If the voltage sources 12 and 14 attain a "positive" imbalance by virtue of source 12 supplying a greater magnitude of voltage than source 14 supplies, the voltage at node 20 rises above ground level. A positive imbalance may occur due to an increase in the voltage level supplied by source 12 or a decrease in the voltage level supplied by source 14. As the voltage at node 20 increases from ground level, desensitizing resistor 22 conducts current away from node 20. This reduces the effect of the voltage imbalance as reflected in the voltage at node 20 and thereby reduces the sensitivity of the imbalance detector. Thus, the resistance of desensitizing resistor 22 determines the threshold imbalance which must be reached before the detection system responds by disconnecting the voltage sources. As the voltage at node 20 continues to increase with increasing imbalance, the voltage at node 30 increases by the same amount. When the voltage at node 30 exceeds about +1.2 volts, diode 32 and the base-emitter diode of transistor 34 become forward biased and transistor 34 turns on. When transistor 34 turns on, current is drawn from node 40, thus reducing the base current available to transistor 42. The reduction in base current to transistor 42 reduces the collector current of transistor 42. This reduction in collector current causes a reduction of the current through the winding of relay 56. The reduction in the current through the winding of relay 56 reduces the voltage drop across the winding and causes an increase in the voltage level at output node 50. The increase in voltage level at output node 50 reduces the voltage drop across resistor 48 inasmuch as the base-emitter diode of transistor 46 is still forward biased and produces a drop of 0.6 volts, whereby the emitter electrode is held at a voltage 0.6 volts above the voltage level at node 50. The reduced voltage across resistor 48 causes a drop in the current through resistor 48. The reduction in current through resistor 48 reduces the emitter current and thereby the collector current of transistor 46. This operation further reduces the base current available to drive transistor 42. Thus, the turn on of transistor 34 provides a positive feedback effect to shut off transistor 42, which in turn causes relay 56 to be de-energized and contacts 58 to open.

When current through transistor 42 ceases, the voltage at output node 50 rises to approximately the level of source 10. Since the winding of relay 56 is inductive, current will continue to flow through the winding for a period of time after logic switching transistor 42 turns off. In the absence of diode 52, this current would induce large positive voltage transients at output node 50. However, diode 52 limits positive voltage transients to voltages less than about 0.6 volts more positive than source 10. When relay 56 is de-energized, contacts 58 change to their unactivated state to disconnect the voltage supplies from protected circuits 62 in order to prevent damage thereto.

When the positive voltage imbalance between sources 12 and 14 reduces, i.e., the magnitude of voltage source 12 is more nearly equal to the magnitude of voltage source 14, the deviation of the voltage at node 20 from ground decreases. This causes a corresponding decrease in the voltage at node 30. As the voltage at node 30 decreases to below about +1.2 volts, the base-emitter diode of transistor 34 begins to come out of saturation. When the base-emitter diode of transistor 34 comes out of saturation, the collector current of transistor 34 begins to decrease. As the collector current decreases, the current through resistor 44 decreases and the voltage drop across resistor 44 decreases. When the voltage drop across resistor 44 has decreased about 0.6 volts, node 40 rises to a voltage level of +0.6 volts. This forward biases the base-emitter diode of transistor 42 and turns transistor 42 on. When transistor 42 turns on, the voltage level at output node 50 drops to substantially ground level. This drop in output voltage level turns on relay 56 resetting the contacts 58 to the activated position to reapply the voltage supplies to the protected circuits. Thus, the circuit condition returns to the normal condition.

The decrease in voltage at output node 50 also turns on transistor 46 to supply additional base current to transistor 42. This increase in current available at node 40 assures that transistor 42 will turn on and saturate promptly and introduces hysteresis into the switching conditions of transistor 42. The hysteresis in the switching conditions of transistor 42 assure that relay 56 will not chatter in the event that the voltage at node 30 varies slightly around the voltage level at which transistor 34 turns on or the level at which transistor 34 turns off.

Hysteresis is induced in the switching characteristics of output logic transistor 42 in the following manner. When transistor 42 is on, transistor 46 is also on. A current supplied to node 40 through resistor 44 is equal to the difference between the voltage of source 10 and the voltage at node 40, divided by the resistance of resistor 44. Since neither transistor 34 nor diode 36 is conducting, this current must be supplied to the base electrode of transistor 42. The voltage across resistor 48 is substantially equal to the voltage of supply 10 when transistors 42 and 46 are on. This induces a current through resistor 48 which is approximately equal to the voltage of source 10 divided by the resistance of resistor 48. A large fraction of this current (i.e., $(\beta - 1)/\beta$ where $\beta$ is the current gain of transistor 46) is supplied to node 40 by transistor 46 and, hence, into the base of transistor 42. Thus, the current through resistor 44 and the current from the collector electrode of transistor 46 together constitute the base current of transistor 42 when transistor 42 is on.

In order for transistor 42 to turn on again when the imbalance condition is removed, the current through resistor 44 alone must be sufficient to turn transistor 42 on inasmuch as transistor 46 is turned off. That is, the current from the collector electrode of transistor 46 must be excess base current, the removal of which is not sufficient to turn transistor 42 off. Therefore, in order to turn transistor 42 off, transistor 34 must operate to draw a collector current in excess of the collector current of transistor 46. That is, in order to turn logic switching transistor 42 off, the collector of transistor 34 must conduct from node 40 all of the collector current from transistor 46 plus part of the current through resistor 44.

A preferred way of assuring that this condition will be met is to make resistors 44 and 48 equal. Under these conditions, when transistor 42 turns off, transistor 34 is already conducting more current than resistor 44 and the conditions for switching hysteresis are clearly met and transistor 34 saturates and holds transistor 42 firmly off.

If a voltage imbalance between sources 12 and 14 results from the magnitude of source 14 exceeding the magnitude of source 12, (i.e., a "negative" imbalance) the voltage at node 20 decreases to below the standard voltage or in the illustrated embodiment ground level. As the voltage at node 20 decreases from ground, desensitizing resistor 22 again operates to reduce the resultant voltage swing and, thus, the sensitivity of the voltage imbalance detection system. As the voltage at node 20 decreases below ground level, the voltage at node 30 decreases by a substantially equal amount. As node 30 becomes more negative, diode 36 tends to become forward biased. As discussed above, under normal conditions transistor 42 is saturated and node 40 is held above ground level by the forward voltage drop (+0.6 volts) across the base-emitter diode of transistor 42. Consequently, when the voltage at node 30 decreases to about ground level, diode 36 has about 0.6 volts forward bias across it. Once diode 36 is forward biased into conduction, it conducts substantial quantities of current into the emitter-collector circuit of isolation transistor 24. The current through diode 36 is drawn from node 40, thereby removing that current from the base current of transistor 42. Once enough current is removed, transistor 42 will turn off. Here again turn off of transistor 42 de-energizes relay 56 and turns off transistor 46.

If the voltage at node 30 drops below about −1.2 volts, diode 38 becoems forward biased to hold node 40 close to ground level and prevent reverse breakdown of the p-n junction of the base-emitter diode of transistor 42. when diode 38 conducts heavily, sufficient current is introduced into the emitter-collector circuit of isolation transistor 24 to limit the negative voltage swing of node 30. When sufficient current has been introduced by diode 38 to cause saturation of transistor 24, any further current contributes to a significant increase in the base current of transistor 24. Under these conditions, resistors 28 and 18 limit the current to safe values for the components of the imbalance detection circuit.

If the negative voltage imbalance is corrected by virtue of the magnitude of voltage source 14 returning once again to the magnitude of voltage source 12, the voltage level at node 20 will increase (i.e., return to normal). As the voltage level at node 20 increases, the voltage level at node 30 will follow whereupon diode 38 will turn off. As the voltage at node 30 increases to above about ground level, the voltage level at node 40 will increase to about +.6 volts. This voltage increase at node 40 will forward bias the base-emitter diode of transistor 42, and cause transistor 42 to turn on in the same fashion as described above in connection with return to normal following a "positive" imbalance.

Diode 52 is connected to output node 50 in order to limit positive voltage transients at output node 50 during the de-energizing of relay 56 in order to protect transistors 42 and 46 from excessive induction voltages.

It will be noted that although the normal voltage at node 30 is offset from ground (+.6 volts), the thresholds at which the imbalance sensing means generate signals are symmetric with respect to deviation of the monitored voltage sources from balance. That is, once node 20 deviates from ground by about .6 volts (either positive or negative), the corresponding imbalance sensing means is activated and supplies a turnoff signal to node 40.

It will be noted that the voltage imbalance protection circuit of this invention responds to changes in the ratio of the magnitudes of the monitored sources and, therefore, provides no "over-voltage/under-voltage" protection as such. If required, such protection can be introduced by connecting an over-voltage/under-voltage protection circuit to one of the monitored supplies so that both the positive and the negative power supplies are disconnected from the protected circuits when the over-voltage/under-voltage protection circuit reacts to improper conditions.

Although in the preferred embodiment the system is set up for operation with positive and negative supplies whose voltage magnitude is equal, it is a simple matter to set up the system for operation with positive and negative supplies of differing magnitudes. In order to provide for such operation, the values of the voltage divider resistors 16 and 18 may be selected in the same ratio as the voltage sources 12 and 14 respectively so that node 20 still produces the standard voltage when the ratio of the magnitudes of the positive and negative voltage sources is at the designated value. If the ratio deviates from the design value in excess of the threshold level set by resistor 22, then the positive or negative imbalance sensing means responds to turn off output logic transistor 42.

Alternatively, a separate standard source can be connected in place of ground voltage with resistors 16 and 18 equal. Thus, the imbalance condition between the positive and negative sources would be sensed relative to the standard source, rather than ground.

If desired, a capacitor can be connected to node 20 to form an RC network with resistor 22 to control circuit sensitivity to transients in the power supply fluctuations.

Furthermore while the description has been made relative to positive and negative sources, it should be manifestly clear that these terms are relative only. For example, it is contemplated that the sources may be of the same polarity or sign, e.g. both positive. However, by adjusting the voltage divider network as described supra, this condition can also be monitored. In fact, with only minor modifications to the system, e.g. substituting a pair of transistors in push-pull arrangement for transistor 24, it is possible to monitor a pair of sources of the same sign and magnitude.

If desired, the detection circuit is readily expanded to monitor a multiplicity of voltage sources.

These and other modifications to the circuit will be apparent to those skilled in the art. However, this description is intended to be illustrative only and not limitative. Consequently, any changes which fall within the purview of the description is intended to be included therein. The scope of the invention is limited only by the appended claims.

Having thus described a preferred embodiment of the invention what is claimed is:

1. A voltage imbalance detection and protection circuit for monitoring the operation of first and second voltage sources which produce voltages which have a predetermined relationship, wherein said imbalance detection and protection circuit monitors the operation of the voltage sources to detect voltage imbalance which would be harmful to protected circuitry operating from the voltage sources and disconnects the protected circuitry from the voltage sources before it is damaged by such voltage imbalances, said detection and protection circuit comprising:

voltage divider means having first and second input terminals and an output terminal;

said voltage divider means having its first input terminal electrically connected to a first monitored voltage source and its second input terminal electrically connected to a second monitored voltage source;

said voltage divider means providing a predetermined voltage at voltage divider output terminal when the voltages provided by said voltage sources have their predetermined relationship;

isolation means having an input terminal and an output terminal;

said isolation means having its input terminal connected to the voltage divider means output terminal;

said isolation means providing a substantially constant voltage offset and substantial current isolation between the input terminal and output terminal thereof;

first voltage imbalance sensing means having an input terminal and an output terminal, said input terminal of said first voltage imbalance sensing means electrically connected to the output terminal of said isolation means for producing an alarm signal when the voltage at the voltage divider output terminal deviates in a first direction from the predetermined voltage as a result of voltage imbalance between said monitored voltage sources;

second voltage imbalance sensing means having an input terminal, and an output terminal, said input terminal of said second voltage imbalance sensing means electrically connected to the output terminal of said isolation means for producing an alarm signal when the voltage at the voltage divider output terminal deviates in a second direction from said predetermined voltage as a result of a voltage imbalance between said monitored voltage sources;

output logic switching means connected to the output terminal of said first voltage imbalance sensing means and to the output terminal of said second voltage imbalance sensing means, said output logic switching means providing a first type of control signal when neither of said first and second voltage imbalance sensing means provides an alarm signal, and a second type of control signal when either said first or said second voltage imbalance sensing means produces an alarm signal;

circuit protection means having normal and abnormal states;

said circuit protection means in its normal state providing a continuous electrical circuit connecting the monitored voltage sources to the protected circuitry and in its abnormal state interrupting the electrical circuit connection between the monitored voltage sources and the protected circuitry, and;

said circuit protection means switching to its abnormal condition only upon receipt of a second type control signal from said output logic switching means and remaining in said abnormal condition until a first control signal is received from said output logic switching means.

2. The voltage imbalance detection and protection circuit of claim 1 further comprising:

hysteresis means having an input terminal and an output terminal; and;

said hysteresis means having the input terminal thereof connected to the output terminal of said output logic switching means and the output terminal thereof connected to the input terminal of said output logic switching means for introducing hysteresis into the switching characteristics of said output logic switching means to prevent oscillatory switching of said logic switching means when said isolation means output voltage is at a level where either the first voltage imbalance sensing means or the second voltage imbalance sensing means switches between alarm and normal conditions.

3. The voltage imbalance detection and protection circuit of claim 2 wherein the first and second monitored voltage sources produce positive and negative voltages, respectively, of equal magnitudes, and said predetermined voltage is substantially zero volts.

4. The voltage imbalance detection and protection circuit of claim 2 further comprising:

desensitizing means having first and second terminals, said first terminal of said desensitizing means electrically connected to said output terminal of said voltage divider means, and;

said second terminal of said desensitizing means electrically connected to a reference voltage source providing said predetermined voltage, said desensitizing means providing a current path for a desensitizing current to reduce the sensitivity of the voltage divider.

5. A voltage imbalance detection and protection circuit for monitoring the operation of first and second voltage sources which produce voltages which have a predetermined relationship, wherein said imbalance detection and protection circuit monitors the operation of the voltage sources to detect voltage imbalance which would be harmful to protected circuitry operating from the voltage sources and disconnects the protected circuitry from the voltage sources before the protected circuitry is damaged by such voltage imbalances, said detection and protection circuit comprising:

voltage divider means having first and second input terminals and comprising first and second impedance means connected in electrical series between said input terminals, said voltage divider means having an output terminal at the connection between said first and second impedance means;

said voltage divider means having said first input terminal electrically connected to a first monitored voltage source and said second input terminal electrically connected to a second monitored voltage source;

said voltage divider means providing a predetermined voltage at said voltage divider output terminal when the voltages provided by said voltage sources have a predetermined relationship;

isolation means comprising transistor means having base, emitter and collector electrodes;

said base electrodes of said transistor comprising the input terminal of said isolation means and electrically connected to said output terminal of said voltage divider means;

said isolation means providing a substantially constant voltage offset and substantial current isolation between the input terminal and output terminal thereof;

third impedance means electrically connected between said first voltage source and said emitter electrode of said isolation transistor;

fourth impedance means electrically connected between said second voltage source and said collector electrode of said isolation transistor;

first voltage imbalance sensing means having an input terminal and an output terminal, said input terminal of said first voltage imbalance sensing means electrically connected to the output terminal of said isolation means for producing an alarm signal when the voltage at the voltage divider output terminal deviates in a first direction from the predetermined voltage as a result of voltage imbalance between said monitored voltage sources;

said first voltage imbalance sensing means comprising a first diode and a second transistor having base, emitter and collector electrodes;

said first diode having a first terminal thereof electrically connected to said emitter electrode of said first transistor and a second terminal thereof electrically connected to said base electrode of said second transistor;

second voltage imbalance sensing means having an input terminal, and an output terminal, said input terminal of said second voltage imbalance sensing means electrically connected to the output terminal of said isolation means for producing an alarm signal when the voltage at the voltage divider output terminal deviates in a second direction from said predetermined voltage as a result of a voltage imbalance between said monitored voltage sources;

said second voltage imbalance sensing means comprising a second diode having a first terminal thereof electrically connected to said collector electrode of said second transistor and a second terminal thereof electrically connected to said emitter electrode of said first transistor;

output logic switching means connected to the output terminal of said first voltage imbalance sensing means and to the output terminal of said second voltage imbalance sensing means, said output logic switching means providing a first type of control signal when neither of said first and second voltage imbalance sensing means provides an alarm signal, and a second type of control signal when either said first or said second voltage imbalance sensing means produces an alarm signal;

said output logic switching means comprising a third transistor having base, emitter and collector electrodes, said base electrode of said third transistor electrically connected to said collector electrode of said second transistor;

hysteresis transistor means having base, emitter and collector electrodes, said collector electrode of said hysteresis transistor electrically connected to said collector electrode of said second transistor and said base electrode of said hysteresis transistor electrically connected to said collector electrode of said third transistor;

fifth impedance means having one terminal thereof electrically connected to said collector electrode of said second transistor;

sixth impedance means having a first terminal thereof electrically connected to said emitter electrode of said hysteresis transistor and a second terminal thereof electrically connected to a second terminal of said fifth impedance means;

circuit protection means having normal and abnormal states;

said circuit protection means in its normal state providing a continuous electrical circuit connecting the monitored voltage sources to the protected circuitry and in its abnormal state interrupting the electrical circuit connection between the monitored voltage sources and the protected circuitry;

said circuit protection means switching to its abnormal condition only upon receipt of a second type control signal from said output logic switching means;

said circuit protection means comprising relay means having a winding electrically connected between said collector electrode of said third transistor and the common connection of said fifth and sixth impedance means;

said relay means having a set of relay contacts selectively connected in electrical series between the monitored voltage source and said protected circuitry; and, voltage source means connected to said common connection of said fifth and sixth impedances.

6. The voltage imbalance detection and protection circuit of claim 5 further comprising:

a reverse breakdown prevention diode connected between said base and said emitter electrodes of said third transistor; and a transient suppression diode electrically connected between said collector electrode of said third transistor and said common connection.

7. The voltage imbalance detection and protection circuit of claim 6 further comprising:

a zener diode connected in electrical series between said winding and said collector electrode of said third transistor.

8. The voltage imbalance detection and protection circuit of claim 5 wherein said voltage source means is said first monitored voltage source.

9. The voltage imbalance detection and protection circuit recited in claim 5 wherein said relay is in its normal state when there is sufficient current in the winding to activate the relay and wherein said first type control signal comprises said sufficient current whereby upon generation of said second type control signal said sufficient current is removed until a first control signal is received from said output logic switching means; whereby said circuit protection means switches to said abnormal state said output logic switching means generates a second type control signal and remains in said abnormal condition until said output logic switching means provides a first type control signal.

* * * * *